United States Patent

Mizuoka et al.

Patent Number: 5,166,986
Date of Patent: Nov. 24, 1992

[54] APPARATUS FOR BINARIZING IMAGE SIGNALS

[75] Inventors: Seiji Mizuoka, Katano; Kazumasa Okumura, Kyoto; Akira Kobayashi, Osaka; Junichi Hada, Moriguchi, all of Japan

[73] Assignee: Matsushita Electric Industrial Co., Ltd., Osaka, Japan

[21] Appl. No.: 523,108

[22] Filed: May 14, 1990

[30] Foreign Application Priority Data

May 16, 1989 [JP] Japan .................................. 1-122137

[51] Int. Cl.$^5$ .............................................. G06K 9/38
[52] U.S. Cl. ...................................... 382/51; 358/466; 382/18
[58] Field of Search ........................ 382/50, 51, 52, 53, 382/27, 18, 22; 358/465, 466

[56] References Cited

U.S. PATENT DOCUMENTS

| | | | |
|---|---|---|---|
| 3,104,372 | 9/1963 | Rabinow et al. | 382/50 |
| 4,003,024 | 1/1977 | Riganati et al. | 382/4 |
| 4,550,437 | 10/1985 | Kobayashi et al. | 382/27 |
| 4,601,057 | 7/1986 | Ssuji et al. | 382/51 |
| 4,675,909 | 6/1987 | Egami et al. | 382/51 |
| 4,741,046 | 4/1988 | Matsunawa et al. | 382/51 |
| 4,742,551 | 5/1988 | Deering | 382/18 |
| 4,783,838 | 11/1988 | Matsunawa | 382/51 |
| 4,791,675 | 12/1988 | Deering et al. | 382/18 |
| 4,831,658 | 5/1989 | Umeda et al. | 382/27 |
| 4,903,313 | 2/1990 | Tachikawa | 382/27 |
| 4,910,787 | 3/1990 | Umeda et al. | 382/18 |
| 4,969,198 | 11/1990 | Batchelder et al. | 382/27 |
| 4,977,603 | 12/1990 | Irie et al. | 382/18 |

FOREIGN PATENT DOCUMENTS 2129635 5/1984 United Kingdom .

OTHER PUBLICATIONS

"Relation of Binary Image Complexity to Gray-Scaled Image Thresholding" by Taniguchi et al., pp. 91-100, 1987.

Primary Examiner—Joseph Mancuso
Attorney, Agent, or Firm—Panitch Schwarze Jacobs & Nadel

[57] ABSTRACT

An apparatus for converting image signals into binary signals is disclosed. The apparatus comprises: a binarizing section for binarizing image signals; a connectivity distribution section for obtaining connectivities between pixels from binary signals and for producing a connectivity distribution; and a judging section for, from connectivity distributions obtained with different binary levels, judging the level at which the frequencies of maximum and minimum connectivities are highest and the sum of the frequencies of intermediate connectivities is minimal.

9 Claims, 7 Drawing Sheets

Fig. 1

CONNECTIVITY

| — | — | — | — |
| — | 2 | 3 | — |
| — | 2 | 5 | — |
| — | — | — | — |

INDETERMINATE

(PRIOR ART)

Fig. 8

58, 59 --- MAXIMUM
60 --- MINIMUM

Fig. 9

APPARATUS FOR BINARIZING IMAGE SIGNALS

BACKGROUND OF THE INVENTION

1. Field of the invention:

This invention relates to an apparatus for binarizing image signals, and more particularly to an apparatus for converting image signals generated from a television camera or the like into binary signals.

Figure 7:
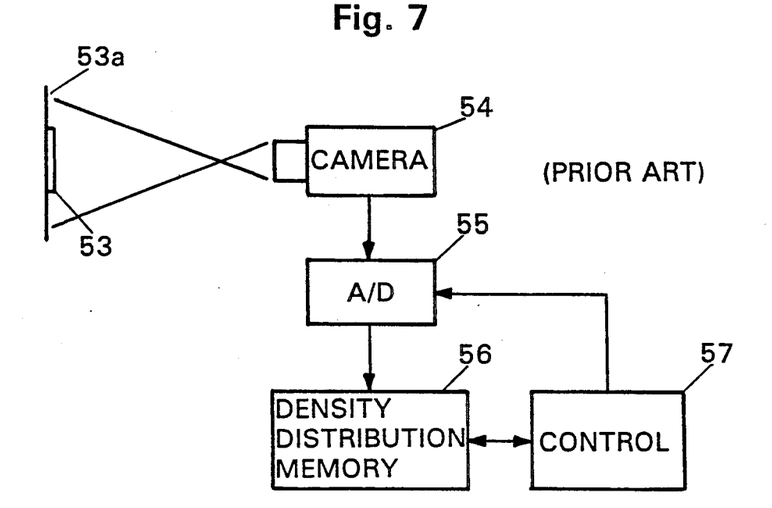
FIG. 7 is a block diagram showing a conventional apparatus.

2. Description of the prior art:

FIG. 7 shows a conventional apparatus of such a kind. The apparatus of FIG. 7 comprises an A/D converter 55, a density distribution memory 56, and a control unit 57. The image signals of an object 53 and a background 53a obtained by a television camera 54 are supplied to the A/D converter 55, and converted into digital signals. The digital image signals are stored in the density distribution memory 56. The control unit 57 determines a threshold level for binarizing the object 53 (hereinafter, such a threshold level is referred to as "a binary level"), from the density distribution of the image signals as described below.

Figure 8:
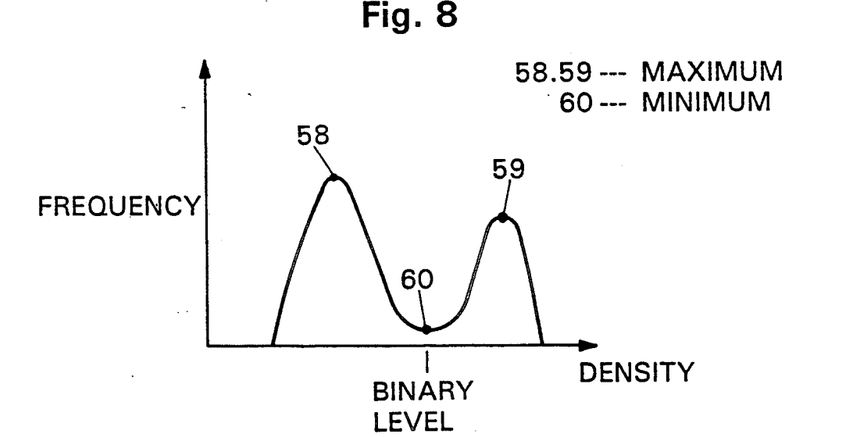
FIG. 8 is a graph of density distribution obtained in the apparatus of FIG. 7.

FIG. 8 shows one example of the density distribution of the image signals stored in the memory 56. As shown in FIG. 8, the density distribution of the image signals obtained from the object 53 and background 53a has two peaks or maximal values 58 and 59 and one valley or minimal value 60. The control unit 57 judges the minimal value 60 sandwiched between the two maximal values 58 and 59 as the binary level, and then converts the image signals into binary signals by using the thus-determined binary level.

Figure 9:
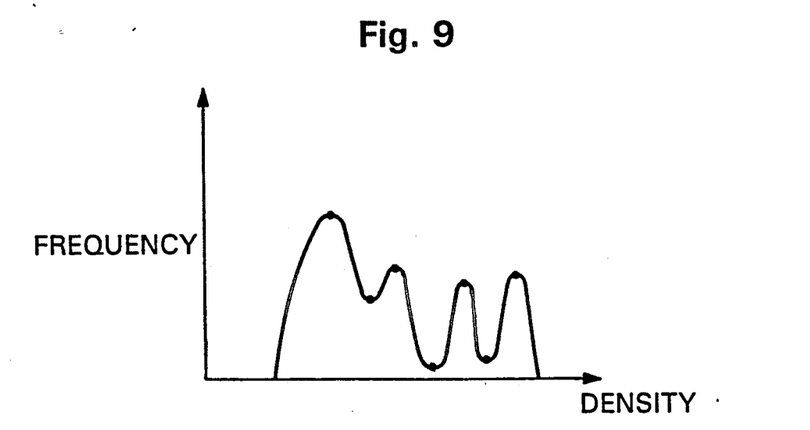
FIG. 9 is another graph of density distribution obtained in the apparatus of FIG. 7.

When the density of the object 53 is not uniform, however, the density distribution will have two or more valleys as shown in FIG. 9. In such a case, it is impossible to determine the binary level uniquely. When there is little difference in density between the object 53 and the background 53a, moreover, the contour of the image may be obscure, with the result that the contour of the obtained binary image become unstable.

SUMMARY OF THE INVENTION

The apparatus for binarizing image signals of this invention, which overcomes the above-discussed and numerous other disadvantages and deficiencies of the prior art, comprises a binarizing means for binarizing image signals; a connectivity distribution means for obtaining connectivities between pixels from binary signals and for producing a connectivity distribution; and a judging means for, from connectivity distributions obtained with different binary levels, judging the level at which the frequencies of maximum and minimum connectivities are highest and the sum of the frequencies of intermediate connectivities is minimal.

The apparatus for binarizing image signals of this invention further comprises: a binarizing means for binarizing image signals; a smoothing means for smoothing binary image signals; a connectivity distribution means for obtaining connectivities between pixels from smoothed binary signals and for producing a connectivity distribution; and a judging means for, from connectivity distributions obtained with different binary levels, judging the level at which the frequencies of maximum and minimum connectivities are highest and the sum of the frequencies of intermediate connectivities is minimal.

The apparatus for binarizing image signals of this invention further comprises: a filtering means for filtering image signals; a binarizing means for binarizing filtered image signals; a smoothing means for smoothing binary image signals; a connectivity distribution means for obtaining connectivities between pixels from smoothed binary signals and for producing a connectivity distribution; and a judging means for, from connectivity distributions obtained with different binary levels, judging the level at which the frequencies of maximum and minimum connectivities are highest and the sum of the frequencies of intermediate connectivities is minimal.

The apparatus for binarizing image signals of this invention further comprises: a plurality of binarizing means each for temporarily binarizing the same set of image signals with a different binary level; a plurality of connectivity distribution means provided correspondingly for each of said binarizing means and each for obtaining connectivities between pixels from binary image signals obtained by the corresponding binarizing means and for obtaining a frequency distribution of connectivities; and a judging means for judging one of said different binary levels as an optimum binary level for said set of image signals, the frequency distribution obtained by using said one of said different binary levels showing that the frequencies of maximum and minimum connectivities are highest and the sum of the frequencies of the intermediate connectivities is minimal.

The apparatus for binarizing image signals of this invention further comprises: a plurality of binarizing means each for temporarily binarizing the same set of image signals with a different binary level; a plurality of smoothing means provided correspondingly for each of said binarizing means and each for smoothing said binary image signals obtained by the corresponding binarizing means; a plurality of connectivity distribution means provided correspondingly for each of said smoothing means and each for obtaining connectivities between pixels from binary image signals supplied from the corresponding smoothing means and for obtaining a frequency distribution of connectivities; and a judging means for judging one of said different binary levels as an optimum binary level for said set of image signals, the frequency distribution obtained by using said one of said different binary levels showing that the frequencies of maximum and minimum connectivities are highest and the sum of the frequencies of the intermediate connectivities is minimal.

The apparatus for binarizing image signals of this invention further comprises: a filtering means for filtering a set of image signals; a plurality of binarizing means each for temporarily binarizing the set of said filtered image signals with a different binary level; a plurality of smoothing means provided correspondingly for each of said binarizing means and each for smoothing said binary image signals obtained by the corresponding binarizing means; a plurality of connectivity distribution means provided correspondingly for each of said smoothing means and each for obtaining connectivities between pixels from binary image signals supplied from the corresponding smoothing means and for obtaining a frequency distribution of connectivities; and a judging means for judging one of said different binary levels as an optimum binary level for said set of filtered image signals, the frequency distribution obtained by using said one of said different binary levels showing that the frequencies of maximum and minimum connectivities are highest and the sum of the frequencies of the intermediate connectivities is minimal.

In a preferred embodiment, each of the connectivity distribution means obtains connectivities of 4-neighbors.

In a preferred embodiment, each of the connectivity distribution means obtains connectivities of 8-neighbors.

In a preferred embodiment, each of the connectivity distribution means obtains connectivities between pixels separated from each other by one or more pixels.

Thus, the invention described herein makes possible the objectives of (1) providing an apparatus for binarizing image signals which can obtain uniquely the binary level even when the density of the object is not uniform; and (2) providing an apparatus for binarizing image signals which can obtain stably binary images even when there is little difference in density between the object and the background.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
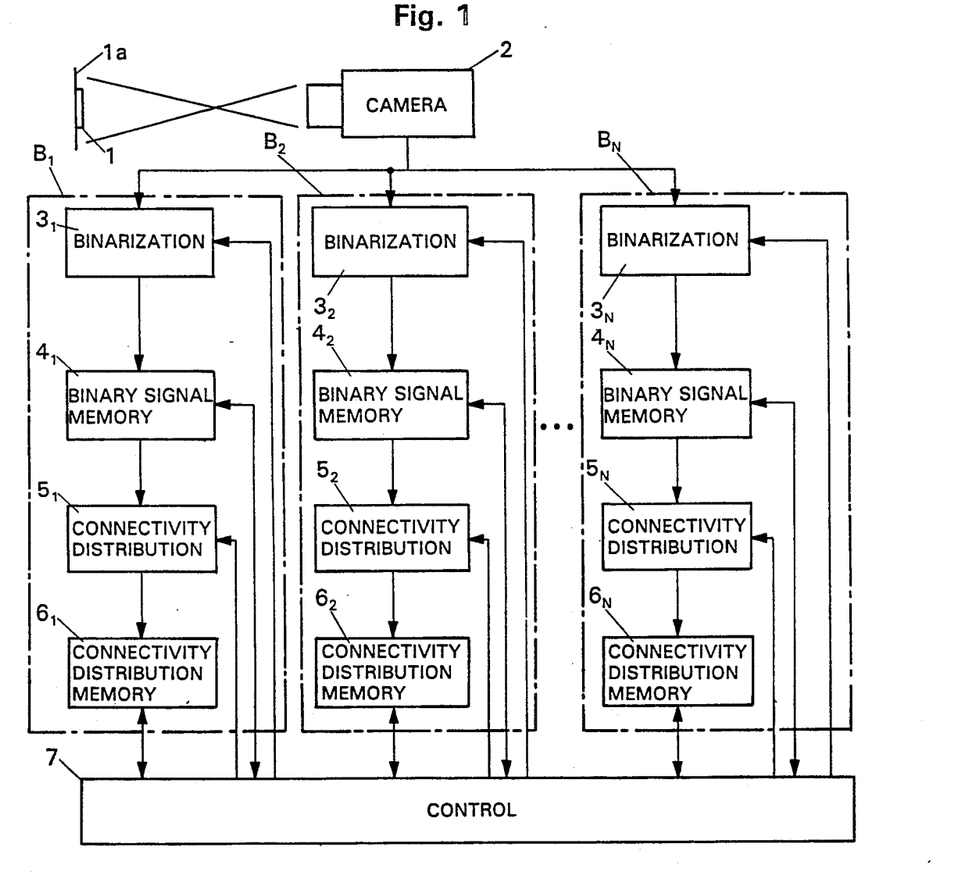
FIG. 1 is a block diagram showing an apparatus according to the invention.

FIG. 1 shows an apparatus according to the invention. The apparatus shown in FIG. 1 converts image signals of an object 1 and background 1a obtained by a television camera 2 into binary image signals, and comprises binarization units $B_1$–$B_N$, and a control unit 7. The binarization units $B_1$–$B_N$ include binarizing sections $3_1$–$3_N$, binary signal memory sections $4_1$–$4_N$, connectivity distribution sections $5_1$–$5_N$, and connectivity memory sections $6_1$–$6_N$, respectively. The binarization units $B_1$–$B_N$ are controlled by the control unit 7. Actually, the binarization units $B_1$–$B_N$ and control unit 7 are realized by a computer system having a CPU, ROM and RAM.

Figure 3A:
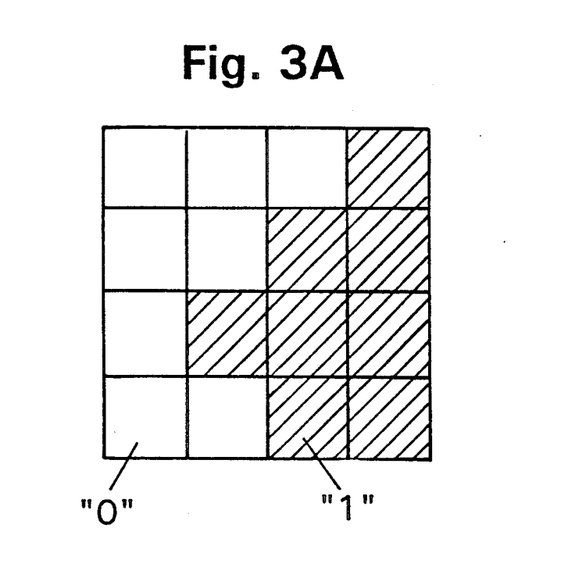
FIG. 3A is a diagram illustrating an image of binary signals.

Image signals representing pixels of the object 1 and background 1a are generated by the television camera 2, and supplied to the binarizing sections $3_1$–$3_N$. In each of the binarizing sections $3_1$–$3_N$, the image signals are temporarily converted into binary signals with a predetermined binary level. The binary levels of the binarizing sections $3_1$–$3_N$ are different from each other, and determined so that they distribute uniformly in a predetermined range. The binary signals output from the binarizing sections $3_1$–$3_N$ are stored respectively in the binary signal memory sections $4_1$–$4_N$. FIG. 3A shows one example of images of binary signals. In FIG. 3A, the hatched squares indicate pixels of "1", and the blank squares indicate pixels of "0". The connectivity distribution sections $5_1$–$5_N$ obtain 4-neighbor connectivities of each pixels, from the stored binary signals.

Figure 2:
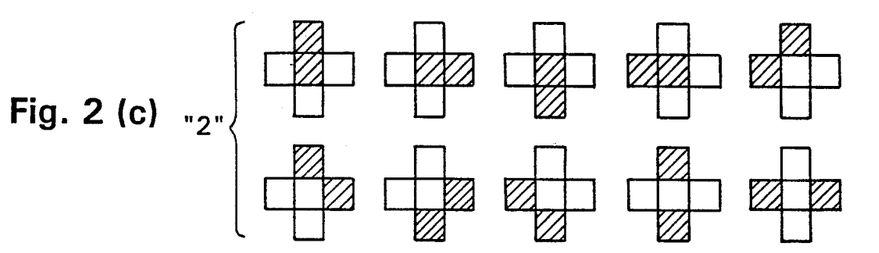
FIGS. 2a–f are diagrams illustrating connectivities of 4-neighbors obtained in the apparatus of FIG. 1.
Figure 3B:
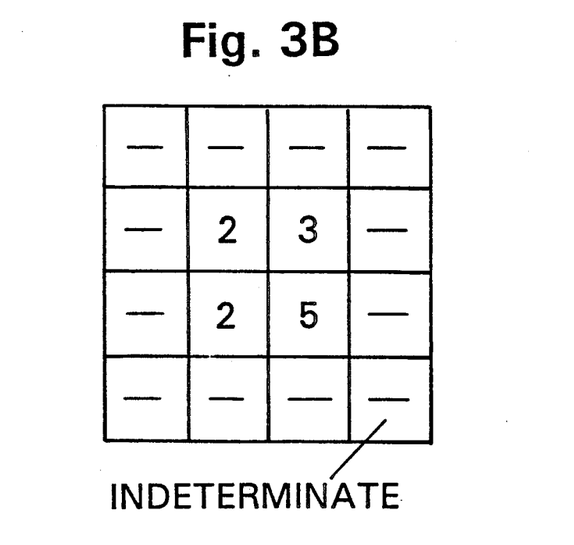
FIG. 3B is a diagram illustrating connectivities obtained from the binary image of FIG. 3A.

The manner of obtaining the connectivities will be described. When the function of connectivity distribution is h(n) and the binary signal at coordinate (x, y) is S(x, y), the distribution of the connectivity group n is obtained by calculating the following expressions:

$$n = S(x,y) + S(x-1,y) + S(x+1,y) + S(x,y-1) + S(x,y+1) \quad (1)$$

$$h(n) = h(n) + 1 \quad (2)$$

over the entire area of the object 1 and background 1a to be recognized. The relationship of expression (1) is illustrated in FIG. 2. When all of an object pixel and its 4-neighbors are "0", the connectivity of the pixel is "0" ((a) of FIG. 2). When only one of an object pixel and its 4-neighbors is "0", the connectivity is "1" ((b) of FIG. 2). Similarly, connectivities "2" to "5" are obtained ((c) to (f) of FIG. 2). The connectivities of the image signals of FIG. 3A which are calculated by the expression (1) are shown in FIG. 3B.

Figure 4:
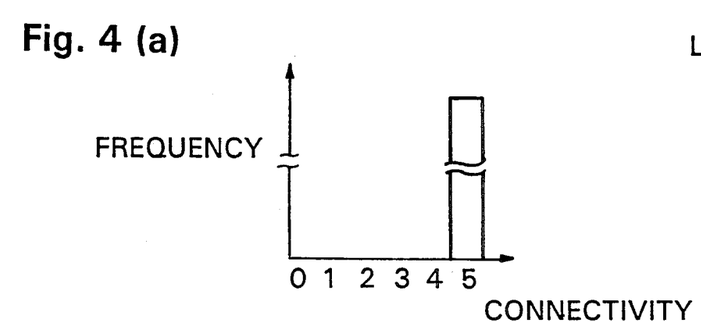
FIGS. 4a–c show histograms of connectivity distributions obtained with different binary levels.

The thus-calculated connectivities are arranged in the form of histograms as shown in FIG. 4 which indicate the distribution of connectivities, and stored in the connectivity memory sections $6_1$–$6_N$, respectively.

The control unit 7 reads the connectivity distributions from the connectivity memory sections $6_1$–$6_N$, and judges one of the temporary binary levels at which the frequencies of the maximum and minimum connectivities are high and the sum of the frequencies of the intermediate connectivities is minimal, as the binary level. More specifically, the temporary binary level at which the frequencies of the minimum connectivity "0" and the maximum connectivity "5" are high and the sum of the frequencies of the intermediate connectivities "1" to "4" are minimal in the connectivity distribution is judged as the optimum binary level. In a stable binary image, the frequencies of the maximal and minimal connectivities are high, and those of the intermediate connectivities are low.

If the temporary binary level is too low, the frequencies in 4-neighbor connectivity distribution concentrate around connectivity "5" as shown in (a) of FIG. 4. If the temporary binary level is too high, in contrast, the frequencies concentrate around connectivity "0" as shown in (c) of FIG. 4. At the optimum binary level, the object 1 and background 1a are clearly separated, and since the binary noise disappears, the frequencies of connectivity concentrate at connectivity "0" for the background 1a and at connectivity "5" for the object 1, and the frequencies of the intermediate connectivities "1"–"4" become very low.

In this way, connectivity distributions obtained at different temporary binary levels are examined, and the temporary binary level at which a connectivity distribution is obtained wherein the frequencies of the maximum and minimum connectivities are high and the sum of the frequencies of the intermediate connectivities is low is judged as the optimum binary level, whereby the optimum binary level can be uniquely determined even when the density of the object is not uniform. Thereafter, the control unit 7 converts the image signals output from the camera 2 into binary signals, by using the thus-determined binary level. Alternatively, the control unit 7 recognizes as the proper binary signals the binary signals stored in one of memory section $4_1$-$4_N$ which belongs to the binarization unit producing the optimum binary level.

The connectivity distribution sections $5_1$-$5_N$ may obtain 8-neighbor connectivities of each pixels instead of 4-neighbor connectivities. Also, it is not necessary to obtain connectivities with respect to all pixels, but it is possible to obtain connectivities with respect to pixels which are arbitrarily selected and are separated by intervals. In the apparatus of FIG. 1, the operation of temporarily converting the image signals into binary signals is concurrently conducted in all of the binarization units $B_1$-$B_N$. The apparatus may be provided with only one binarization unit, and designed so that plurality of such operations with different binary levels are conducted in series by the sole binarization unit.

Figure 5:
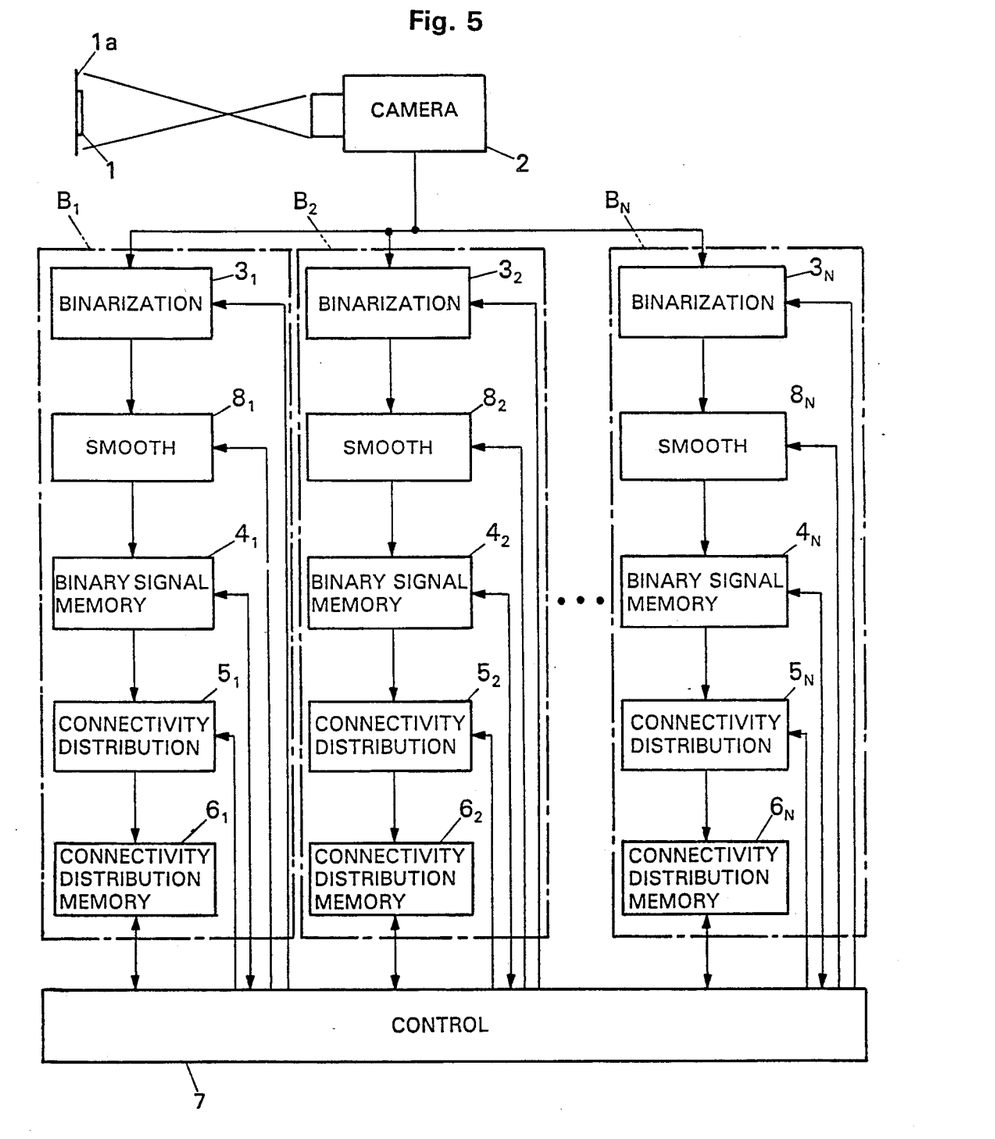
FIG. 5 is a block diagram showing another apparatus according to the invention.

FIG. 5 shows another apparatus according to the invention. In the apparatus of FIG. 5, smoothing sections $8_1$-$8_N$ are disposed respectively between the binarizing sections $3_1$-$3_N$ and the binary signal memory sections $4_1$-$4_N$. Other components may be the same as those of the apparatus of FIG. 1. The smoothing sections $8_1$-$8_N$ performs one of known smoothing methods (e.g., by magnifying and reducing the images) to smooth the binary image signals output from the binarizing sections $3_1$-$3_N$. The smoothed binary signals are stored in the binary signal memory sections $4_1$-$4_N$. According to the above-described configuration, the signal converted to a binary signal is smoothed, and the connectivity distributions of the smoothed image signals obtained at different temporary binary levels are examined, whereby the optimum binary level at which a stabilized image of the object 1 is obtained can be uniquely determined.

Figure 6:
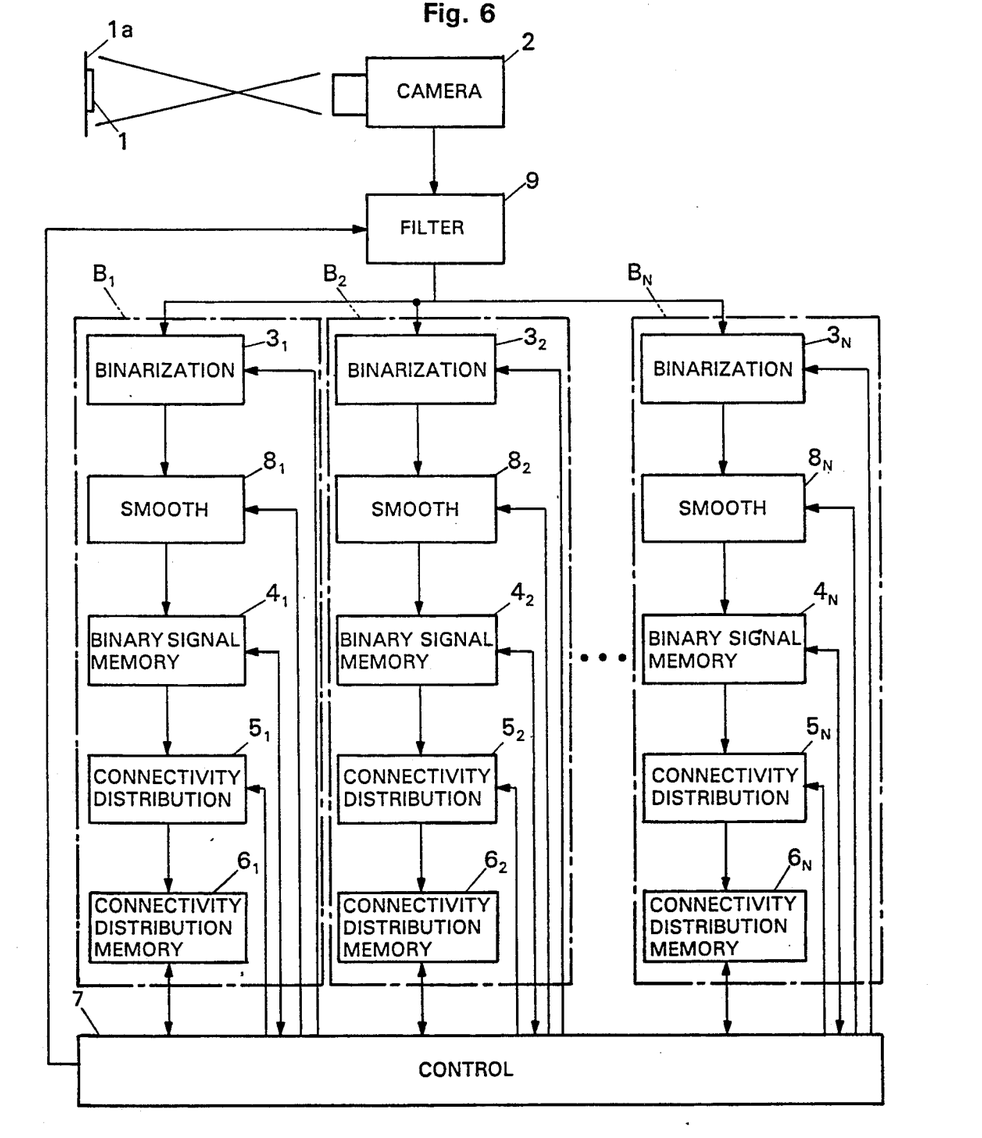
FIG. 6 is a block diagram showing a further apparatus according to the invention.

FIG. 6 shows a further apparatus according to the invention. The apparatus of FIG. 6 comprises the same configuration as that of the apparatus of FIG. 5, except that a filtering unit 9 having a plurality of filtering characteristics is disposed between the television camera 2 and the binarization units $B_1$-$B_N$. The filtering unit 9 has, and performs the filtering operation in accordance with one of the filtering characteristics. The image signals output from the television camera 2 are supplied to the filtering unit 9 in which the image signals are filtered according to the filtering characteristics selected by a command from the control unit 7 so as to match the image characteristics of the object 1 and background 1a. The command for selecting one of the filtering characteristics may be produced in accordance with the manual selection by an operator. Alternatively, the control unit 7 may select automatically one of the filtering characteristics by performing a feedback control, so that resulting binary images can be optimized. Then, the filtered image signals are supplied to binarizing sections $3_1$-$3_N$ of the binarization units $B_1$-$B_N$, and subjected to the same processes as described above. By filtering the image signals, the edges of the image are emphasized, and thus the contour shape can be adequately extracted.

In the above-described configuration, after being filtered, the image signals are temporarily converted into binary signals, the binary signals are then smoothed, and the optimum binary level is determined on the basis of the smoothed binary signals. Therefore, the optimum binary level at which a stable contour shape of the object is obtained can be determined even when the density difference between the object 1 and the background 1a is small.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An apparatus for binarizing image signals, comprising:
    a plurality of binarizing means each for temporarily binarizing the same set of image signals with a different binary level;
    a plurality of connectivity distribution means provided correspondingly for each of said binarizing means and each for obtaining connectivities between pixels from binary image signals obtained by the corresponding binarizing means and for obtaining a frequency distribution of connectivities, said connectivity distribution means obtaining connectivities with at least four neighboring pixels; and
    a judging means for judging one of said different binary levels as an optimum binary level for said set of image signals by identifying said one of said different binary levels at which the frequency distribution of connectivities shows the frequencies of maximum and minimum connectivities to be the highest and the sum of the frequencies of the intermediate connectivities to be minimal.

2. An apparatus according to claim 1, wherein each of said connectivity distribution means obtains connectivities with at least 8 neighboring pixels.

3. An apparatus according to claim 1, wherein each of said connectivity distribution means obtains connectivities between pixels separated from each other by one or more pixels.

4. An apparatus for binarizing image signals, comprising:
    a plurality of binarizing means each for temporarily binarizing the same set of image signals with a different binary level;
    a plurality of smoothing means provided correspondingly for each of said binarizing means and each for smoothing said binary image signals obtained by the corresponding binarizing means;
    a plurality of connectivity distribution means provided correspondingly for each of said smoothing means and each for obtaining connectivities between pixels from binary image signals supplied from the corresponding smoothing means and for obtaining a frequency distribution of connectivities, said connectivity distribution means obtaining connectivities with at least four neighboring pixels; and
    a judging means for judging one of said different binary levels as an optimum binary level for said set of image signals by identifying said one of said different binary levels at which the frequency distribution of connectivities shows the frequencies of maximum and minimum connectivities to be the highest and the sum of the frequencies of the intermediate connectivities to be minimal.

5. An apparatus according to claim 4, wherein each of said connectivity distribution means obtains connectivities with at least 8 neighboring pixels.

6. An apparatus according to claim 4, wherein each of said connectivity distribution means obtains connectivities between pixels separated from each other by one or more pixels.

7. An apparatus for binarizing image signals, comprising:
 a filtering means for filtering a set of image signals;
 a plurality of binarizing means each for temporarily binarizing the set of said filtered image signals with a different binary level;
 a plurality of smoothing means provided correspondingly for each of said binarizing means and each for smoothing said binary image signals obtained by the corresponding binarizing means;
 a plurality of connectivity distribution means provided correspondingly for each of said smoothing means and each for obtaining connectivities between pixels from binary image signals supplied from the corresponding smoothing means and for obtaining a frequency distribution of connectivities, said connectivity distribution means obtaining connectivities with at least four neighboring pixels; and
 a judging means for judging one of said different binary levels as an optimum binary level for said set of filtered image signals by identifying said one of said different binary levels at which the frequency distribution of connectivities shows the frequencies of maximum and minimum connectivities to be the highest and the sum of the frequencies of the intermediate connectivities to be minimal.

8. An apparatus according to claim 7, wherein each of the connectivity distribution means obtains connectivities with at least 8 neighboring pixels.

9. An apparatus according to claim 7, wherein each of said connectivity distribution means obtains connectivities between pixels separated from each other by one or more pixels.

* * * * *